United States Patent [19]
Walker

[11] Patent Number: 5,213,303
[45] Date of Patent: May 25, 1993

[54] SOLENOID ACTUATED VALVE WITH ADJUSTABLE FLOW CONTROL

[75] Inventor: Samuel C. Walker, Upland, Calif.

[73] Assignee: Southwest Fabricators Corp., Tucson, Ariz.

[21] Appl. No.: 846,383

[22] Filed: Mar. 5, 1992

[51] Int. Cl.⁵ ............................................ F16K 31/365
[52] U.S. Cl. ............................ 251/30.02; 251/129.17; 251/45
[58] Field of Search ............... 251/30.01, 30.02, 30.03, 251/30.04, 30.05, 129.01, 331, 45, 35, 129.15, 129.17; 137/596.16

[56] References Cited

U.S. PATENT DOCUMENTS

| | | | |
|---|---|---|---|
| 2,102,076 | 12/1937 | Johnson | 251/30.01 |
| 2,596,409 | 5/1952 | Johnson et al. | 251/127.17 X |
| 4,081,171 | 3/1978 | Morgan et al. | 251/30.02 |
| 4,105,186 | 8/1978 | Eby | 251/30.02 X |
| 4,226,259 | 10/1980 | Szekely et al. | 251/30.01 X |
| 4,295,631 | 10/1981 | Allen | 251/45 X |
| 4,893,645 | 1/1990 | Augustinas et al. | 251/30.02 X |
| 4,972,874 | 11/1990 | Jackson | 251/30.05 X |

Primary Examiner—Martin P. Schwardron
Assistant Examiner—Kevin L. Lee
Attorney, Agent, or Firm—Kelly Bauersfeld & Lowry

[57] ABSTRACT

An improved solenoid actuated valve is provided of the type having a fluid pressure-operated diaphragm to move a valve head between open and closed positions. Fluid under pressure at a valve inlet is admitted through a diaphragm port to a control chamber for normally retaining the diaphragm and a valve head carried thereby in the closed position. A solenoid unit is actuatable to vent the control chamber to relieve pressure therein, whereby the fluid pressure at the valve inlet displaces the diaphragm to open the valve head. The opened valve head moves into close proximity with a flow control piston within the control chamber and cooperates therewith to meter fluid outflow from the control chamber in a manner maintaining a minimal or substantially zero pressure differential across the diaphragm. The position of the flow control piston is adjustable to variably select the open position of the valve head in accordance with a desired valve flow rate. Improved filters for the diaphragm port and for the solenoid unit are also disclosed.

19 Claims, 4 Drawing Sheets

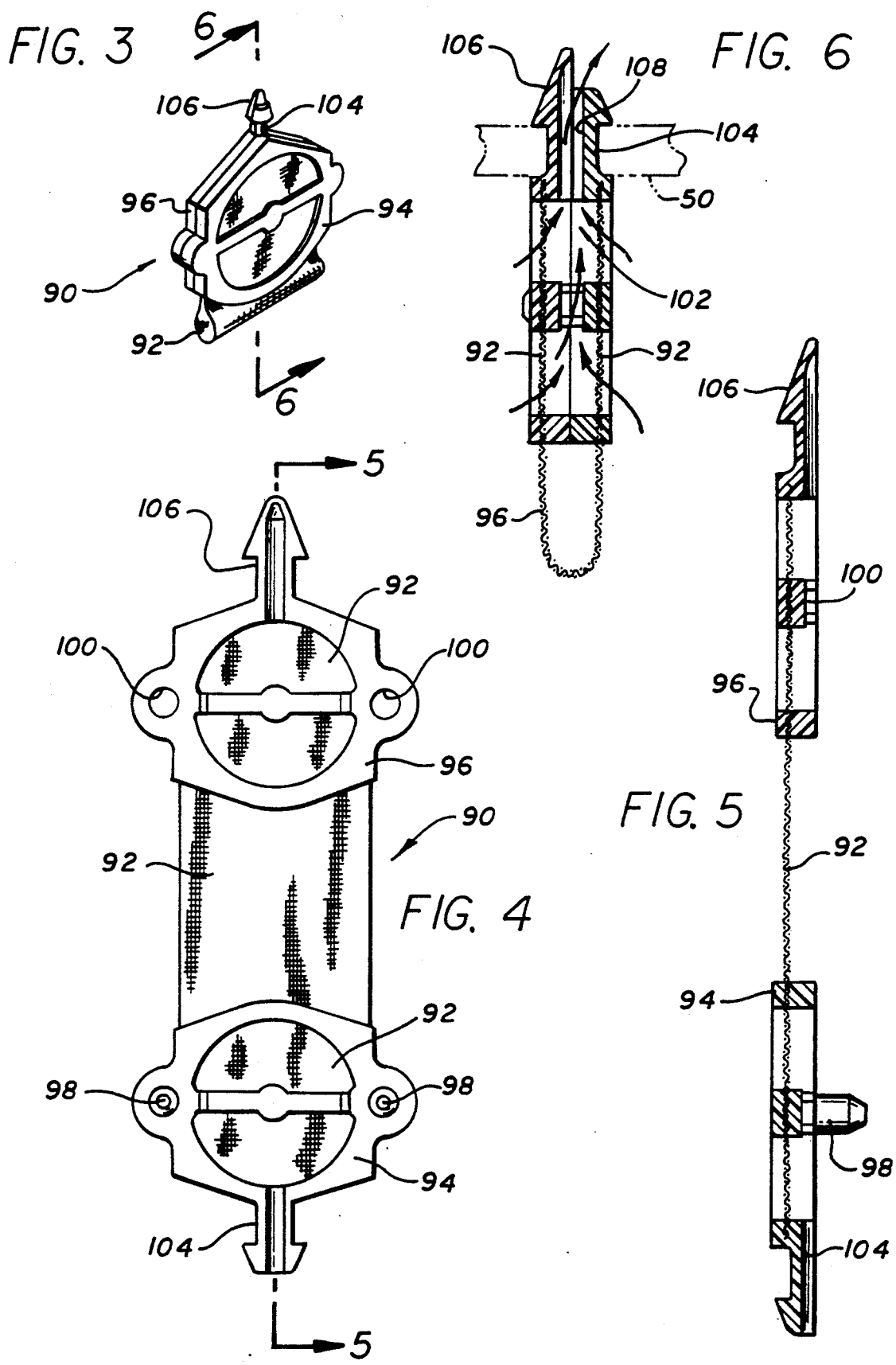

SOLENOID ACTUATED VALVE WITH ADJUSTABLE FLOW CONTROL

BACKGROUND OF THE INVENTION

This invention relates generally to solenoid actuated valves of the type having a fluid pressure-operated diaphragm to control movement of a valve disc between open and closed positions. More specifically, this invention relates to an improved solenoid actuated valve designed to maintain a minimum or substantially zero pressure differential across the diaphragm in both the open and closed positions of the valve, while providing adjustable selection of fluid flow rate through the valve.

Solenoid actuated valves are generally known in the art for use in opening and closing a valve member or head to correspondingly permit or prevent flow of a fluid such as water along a flow line or conduit. In this regard, solenoid actuated valves commonly include a pressure-operated resilient diaphragm supporting the valve head mounted centrally thereon for movement between open and closed positions. One side of the diaphragm is exposed to a control chamber adapted to be filled with fluid under pressure obtained typically by bleed flow from the valve inlet, to maintain the diaphragm and valve head in the closed position. A solenoid unit is actuatable to open a vent path to relieve pressure within the control chamber, and thereby permit the fluid pressure at the valve inlet to displace the valve head and/or diaphragm to the open position. Denergization of the solenoid unit recloses the vent path, resulting in pressure build-up in the control chamber to return the diaphragm and valve head to the closed position. Solenoid actuated valves of this general type are used in a wide variety of fluid flow control situations, such as irrigation systems and the like.

In one configuration, the diaphragm and valve head are arranged to expose the valve head in the closed position to elevated fluid pressure at the valve inlet, with a bleed port permitting fluid flow through the valve head to the control chamber. However, this configuration undesirably exposes the resilient diaphragm to a substantial pressure differential when the valve is closed, typically for prolonged time periods between short intervals when the valve is opened. In the event of diaphragm failure attributable to this pressure exposure, the valve will fail in the open position and substantial fluid leakage and/or loss may occur.

In an alternative configuration, the diaphragm is exposed on both sides to the fluid inlet pressure when the valve is closed, thereby substantially balancing the pressures across the diaphragm in the closed condition. When the valve is opened upon venting of the control chamber, however, the diaphragm is again exposed to a substantial fluid pressure differential. To avoid premature diaphragm failure as a result of this pressure differential exposure, the diaphragm has been designed to incorporate substantial structural reinforcement throughout most or all of the diaphragm surface area. Alternately, a rigid backstop structure is provided to support and retain the diaphragm in the open position. Structural reinforcement of the diaphragm undesirably increases the complexity and cost of the valve, whereas the use of rigid backstop structures is incompatible with adjustable setting of the valve head for different selected fluid flow rates through the open valve. In this regard, variable selection of the valve flow rate may be particularly desirable in some operating environments, such as in an irrigation system application wherein generally balanced flow rates to different irrigation zones may be required.

There exists, therefore, a significant need for an improved solenoid actuated valve which minimizes or eliminates fluid pressure differentials across a pressure-operated diaphragm in both the open and closed positions of the valve, while additionally permitting effective regulation of valve fluid flow rate. The present invention fulfills these needs and provides further related advantages.

SUMMARY OF THE INVENTION

In accordance with the invention, an improved solenoid actuated valve is provided of the type having a pressure-operated diaphragm for moving a valve member between open and closed positions. Means are provided for maintaining a minimum pressure differential across the diaphragm in both of the open and closed positions, while permitting variable adjustment of the valve member in the open position to accommodate valve flow rate control.

In the preferred form, the diaphragm is mounted within a valve housing and includes a central reinforced section defining a valve head positioned for movement between open and closed positions with respect to an adjacent valve seat. The diaphragm defines a flexible or resilient annular structure surrounding the valve head with one side exposed to fluid pressure at a valve inlet. The opposite side of the diaphragm is exposed to a control chamber into which a bleed flow of fluid under pressure is admitted via a port formed in the diaphragm. A solenoid unit normally closes a vent path leading from the control chamber, whereby fluid pressure build-up within the control chamber displaces the diaphragm and valve head thereon to a normal closed position. Actuation of the solenoid unit opens the vent path to relieve pressure within the control chamber, thereby permitting the fluid pressure at the valve inlet to displace the diaphragm and valve head thereon to an open position.

When the diaphragm and valve head are in the closed position, the resilient annular diaphragm is exposed on both sides to substantially balanced pressures corresponding with the fluid pressure at the valve inlet. When the solenoid unit is actuated to open the valve, a pressure differential of short duration occurs across the diaphragm to displace the diaphragm and valve head to the open position, with the valve head retracted from the adjacent valve seat. In the open position, the valve head moves into close proximity with a cylindrical flow control piston mounted within the control chamber. The open valve head cooperates with the flow control piston to meter fluid outflow from the control chamber in a manner minimizing or substantially eliminating pressure differential across the diaphragm. Importantly, the flow control piston is positionally adjustable in a direction toward and away from the valve seat for variably selecting the specific open position of the valve head, thereby variably selecting the specific fluid flow rate through the open valve.

In accordance with further aspects of the invention, a diaphragm filter is provided at the diaphragm flow port to resist or prevent clogging of the flow port with water entrained debris. The diaphragm filter comprises a filter screen element mounted on a support cartridge having a barbed tubular tip for press-fit reception through the resilient diaphragm. A solenoid filter is also provided to prevent passage of water borne debris into contact with moving components of the solenoid unit.

These and other features and advantages of the present invention will become more apparent from the following detailed description, taken in conjunction with the accompanying drawings which illustrate, by way of example, the principles of the Invention.

BRIEF DESCRIPTION OF THE DRAWINGS

The accompanying drawings illustrate the invention. In such drawings:

FIG. 3 is a perspective view illustrating an assembled diaphragm filter for use in the invention;

FIG. 4 is an enlarged plan view illustrating the diaphragm filter of FIG. 3, prior to assembly thereof;

FIG. 5 is an enlarged fragmented sectional view taken generally on the line 5—5 of FIG. 4;

FIG. 6 is an enlarged fragmented sectional view taken generally on the line 6—6 of FIG. 3;

DETAILED DESCRIPTION OF THE PREFERRED EMBODIMENT

Figure 1:
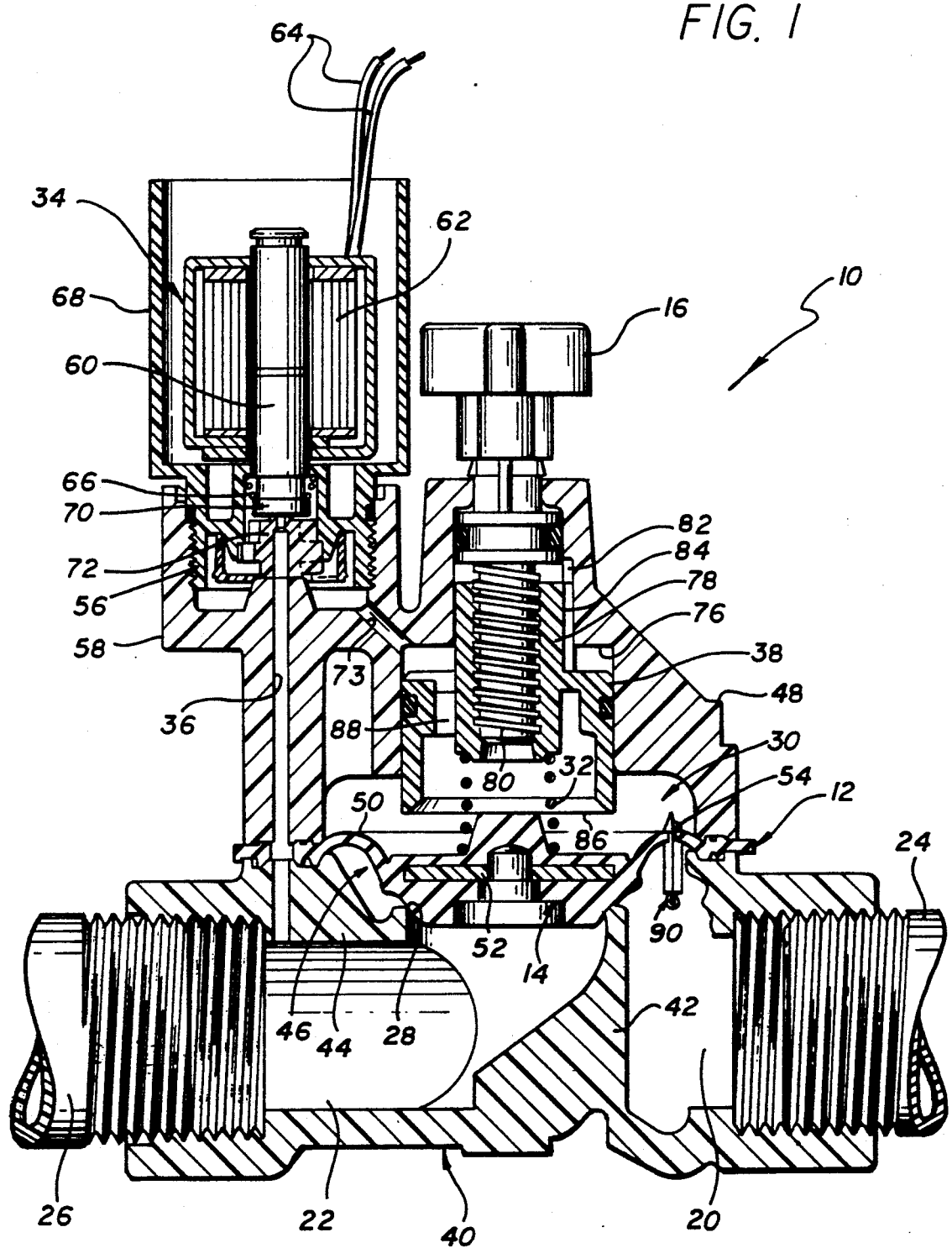
FIG. 1 is a fragmented cross sectional view of a solenoid actuated valve with adjustable flow control, embodying the novel features of the invention, and depicting the valve in a closed position.

As shown in the exemplary drawings, an improved solenoid actuated valve referred to generally in FIG. 1 by the reference numeral 10 includes a pressure-operated resilient diaphragm 12 for opening and closing a valve member or head 14. The valve 10 is designed to maintain a relatively low and substantially minimum pressure differential across the resilient diaphragm in both of the open and closed positions of the valve head 14, while additionally providing for relatively simple and easy selection of the fluid flow rate through the open valve, by means of an externally accessible rotatable handle 16.

Figure 2:
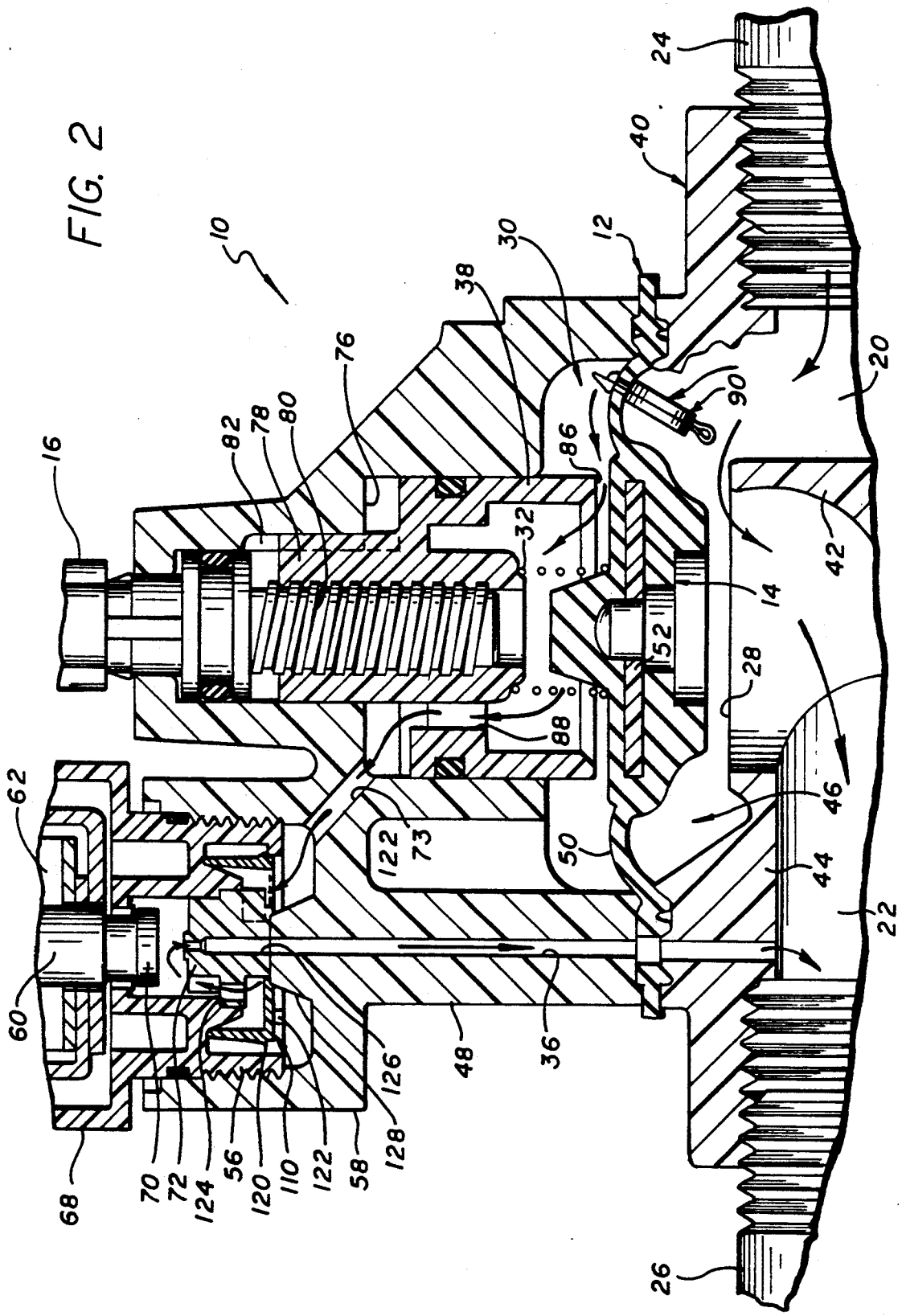
FIG. 2 is an enlarged fragmented cross sectional view of a portion of the solenoid actuated valve shown in FIG. 1, and illustrating the valve in an open position.

The solenoid actuated valve 10 generally comprises a valve housing formed from appropriate cast metal or molded plastic materials to define a valve inlet 20 and a valve outlet 22 adapted for respective connection to appropriate inlet and outlet conduits 24 and 26. A valve seat 28 is formed within the valve housing for seated reception of the valve head 14 to close the valve and prevent fluid flow from the inlet 20 to the outlet 22. The valve head 14 is movably carried at a central section of the diaphragm 12. The diaphragm 12 and valve head 14 thereon are normally maintained in the closed position by fluid pressure within a control chamber 30, in combination with a small closure force applied to the valve head 14 by a spring 32. A solenoid unit 34 is actuatable to open a bleed passage or vent path 36 to relieve pressure within the control chamber 30, and thereby permit fluid pressure at the valve inlet 20 to displace the diaphragm 12 with the valve head 14 thereon to an open position (FIG. 2). Solenoid actuated valves of this general type are commonly used in applications requiring electrical remote control operation of a valve between open and closed positions, such as in controlling supply of irrigation water to an irrigation or sprinkler system.

The present invention beneficially minimizes or eliminates significant pressure differentials across the resilient diaphragm 12 in both of the open and closed positions of the valve, thereby minimizing risk of diaphragm wear and failure attributable to exposure to substantial fluid pressure differentials. Importantly, this minimization of diaphragm pressure differential is accomplished by means of an adjustable flow control piston 38 which is conveniently and easily set by the valve handle 16 to correspondingly and variably select the open position of the valve head 14. Notably, piston 38 is substantially the same diameter as seat 28, eliminating the mechanical bending of the diaphragm found with a conventional flow control stem. As a result, the valve 10 can be adjustably set at a selected fluid flow rate between the valve inlet 20 and the valve outlet 22, when the valve head 14 is in the open position.

More specifically, with reference to FIGS. 1 and 2, the valve housing comprises a lower base 40 defining the valve inlet and outlet 20, 22, shown in coaxial alignment with appropriate fittings for respective connection as by threading to the inlet and outlet conduits 24, 26. An upstanding arcuate wall 42 within the housing base 40 blocks a straight line flow path between the inlet and outlet, and cooperates with an upper side wall 44 to define the annular valve seat 28. As shown, the housing structure forming the valve seat is surrounded by an annular recessed cavity 46 in fluid flow communication with the valve inlet 20.

The valve housing further includes a generally shell-shaped upper bonnet 48 adapted for secure mounting onto the housing base 40 in a known manner, by means of connecting screws (not shown) or the like. The bonnet 48 cooperates with the base 40 to capture and retain a peripheral margin of the diaphragm 12 which may be conveniently formed from a resilient natural or synthetic elastomer or the like. The diaphragm 12 extends radially inwardly from its peripheral margin to define a shallow convolution 50 of generally annular shape, and a relatively high degree of resilient flexibility. The convolution 50 overlies the annular pressure cavity 46 and is joined to the valve head 14. In the preferred form, the valve head 14 is formed integrally with the remainder of the diaphragm 12, as a thickened or stiffened central region which may include an internal comolded reinforcement plate 52. FIG. 1 shows the valve head 14 to include a tapered or contoured lower face adapted for seated or mating engagement with the valve seat 28 for purposes of closing the valve.

The bonnet 48 has a generally dome-shaped configuration and cooperates with the diaphragm 12 to define the control chamber 30 disposed over the diaphragm 12 and the valve head 14 thereon. A flow port 54 is formed in the diaphragm 12 generally within the flexible convolution 50 to permit a small bleed flow of pressurized fluid from the valve inlet 20 into the control chamber 30. When the control chamber is not vented, this bleed flow results in a pressure increase within the control chamber 30 substantially to a pressure level corresponding with the valve inlet 20. Accordingly, the fluid pressure within the control chamber acting upon the entire upper surface area of the diaphragm 12 and valve head 14 overcomes the fluid inlet pressure at the valve inlet acting upon the annular diaphragm convolution, whereby the diaphragm and valve head are normally moved to and retained at the closed position as viewed in FIG. 1. In the closed position, the flexible convolution 50 of the diaphragm 12 is subjected to a substantially zero pressure differential as a result of the exposure at both sides thereof to the fluid inlet pressure. The biasing spring 32 reacts between the flow control piston 38 and the valve head 14 to contribute a small spring force assuring positive valve head closure.

The solenoid unit 34 is mounted on the valve housing bonnet 48, by means of a threaded nose end 56 of the solenoid unit for installation into a mating threaded fitting 58. The solenoid unit 34 includes a plunger 60 mounted for axial sliding movement within a solenoid winding 62 in response to connection of the winding to an electrical current by means of conductors 64. In the nonenergized state, a biasing spring 66 reacts between a portion of a solenoid unit housing 68 and a plunger tip 70 for normally closing the bleed passage 36. As shown in FIGS. 1 and 2, the bleed passage 36 is formed in the bonnet 48 and the housing base 40 to extend from a ported retainer 72 of the solenoid unit 34 to a downstream flow position generally at the valve outlet 22. The plunger tip 70 normally seats on the retainer 72 to prevent fluid flow from the control chamber 30 and an associated exit port 73 to the bleed passage 36.

When the solenoid unit 34 is energized or actuated by connection of the winding 62 to an appropriate electrical current, the plunger 60 is retracted to open the vent path and permit fluid outflow from the control chamber 30 through the bleed passage 36 to the valve outlet 22. This fluid outflow results in relieving the pressure within the control chamber 30, whereupon the fluid pressure at the valve inlet 20 applied to the underside of the diaphragm 12 acts to lift the diaphragm 12 and valve head 14 thereon to an open position, as shown in FIG. 2. The valve head 14 is thus separated from the valve seat 28, to permit fluid flow from the valve inlet 20 and through the now-open valve seat 28 to the valve outlet 22. The valve head 14 will remain in the open position for the duration of solenoid unit energization. Denergization of the solenoid unit results in spring-loaded return of the plunger 60 to a position closing the vent path, whereupon the pressure level in the control chamber 30 elevates and functions to return the diaphragm and valve head to the closed position of FIG. 1.

The flow control piston 38 is adjustably mounted within the control chamber 30 and functions to permit variable selection of fluid flow rate through the open valve, while additionally maintaining the pressure differential across the flexible diaphragm at a substantially constant level when the valve is open. The piston 38 is shown with a generally cup-shaped and downwardly open configuration mounted within a cup-shaped cavity 76 in the bonnet 48. The flow control piston 38 includes an internally threaded hub 78 which receives a threaded stem 80 on the externally mounted valve handle 16. An internal rib 82 on the bonnet 48 is engaged with an axial slot 84 on the piston hub 78, to prevent rotation of the flow control piston with the valve handle 16. As a result, manual rotation of the valve handle 16 is effective to advance and retract the flow control piston 38 respectively toward and away from the underlying valve head 14. As shown clearly in FIGS. 1 and 2, the flow control piston 38 can be advanced to position an annular leading edge 86 into the control chamber 30

When the solenoid unit 34 is energized to open the valve, the valve head 14 is displaced upwardly from the valve seat 28 into close proximity with the annular leading edge 86 of the piston 38, as viewed in FIG. 2. As the valve head 14 approaches the flow control piston 38, the diaphragm is briefly subjected to a pressure differential sufficient to effect valve opening. As the valve head nears the piston 38, the valve head and control piston effectively subdivide the control chamber 30 into an annular outer zone overlying the annular flexible convolution of the diaphragm 12, and a circular inner zone disposed within the piston 38 and overlying the stiffer valve head 14. The valve head 14 will move toward the leading edge 86 of the flow control piston 38 sufficiently to meter or orifice water flow from above the flexible portion of the diaphragm 12 to the interior of the flow control piston 38, in a manner minimizing or substantially eliminating pressure differential across the diaphragm flexible portion. From the interior of the piston 38, the water is free to pass through one or more open discharge ports 88 in the piston 38 for flow further through the exit port 73 to the bleed passage 36.

In accordance with one primary aspect of the invention, the positionally adjustable flow control piston 38 permits variable selection of the specific valve flow rate in the open position. That is, rotation of the external valve handle 16 displaces the flow control piston 38 toward and away from the underlying valve seat 28, thereby orienting the annular leading edge 86 of the piston 38 to regulate the specific position of the valve head 14 in the open position. That is, when the valve head 14 is in the open position, the valve head is spaced an essentially fixed increment from the leading edge 86 of the piston 38, wherein the spacing is effective to meter water outflow from the annular outer zone of the control chamber 30 for maintaining a low or substantially zero pressure differential across the flexible annular portion of the diaphragm. Movement of the flow control piston 38 toward the valve seat thus effectively selects a different open position for the valve head 14, wherein this open position is shifted closer to the valve seat to reduce valve flow rate, and vice-versa. This adjustment in valve flow rate can be performed quickly and easily, and with significant precision, while the valve 10 is open, if desired. The maintenance of minimal pressure differential across the flexible portion of the diaphragm in the open condition provides minimal resistance to valve head positional adjustment.

In accordance with a further primary aspect of the invention, a diaphragm filter 90 is mounted on the flexible portion 50 of the diaphragm 12 to prevent obstruction of the flow port 54 with water-borne debris. The preferred diaphragm filter 90 is shown in FIGS. 3-6, and comprises a relatively short length of fine mesh screen 92 having opposite ends mounted as by comolding with an interlocking pair of support rings 94 and 96. These support rings include interlocking components such as posts 98 on the support ring 94 for snap-fit reception into ports 100 on the support ring 96. When interlocked, the support rings 94, 96 define a support cartridge which retains opposing segments of the screen 92 in spaced relation to define a disk-shaped cavity 102 (FIG. 6) into which water at the valve inlet is free to flow. The support rings 94, 96 additionally define a mating pair of semitubular tips 104, 106 which, when the support rings are interlocked, have a barbed exterior for press-fit mounting through the resilient diaphragm, and define an internal orifice 108 of fixed dimension for water bleed flow through the diaphragm to the control chamber.

Figure 7:
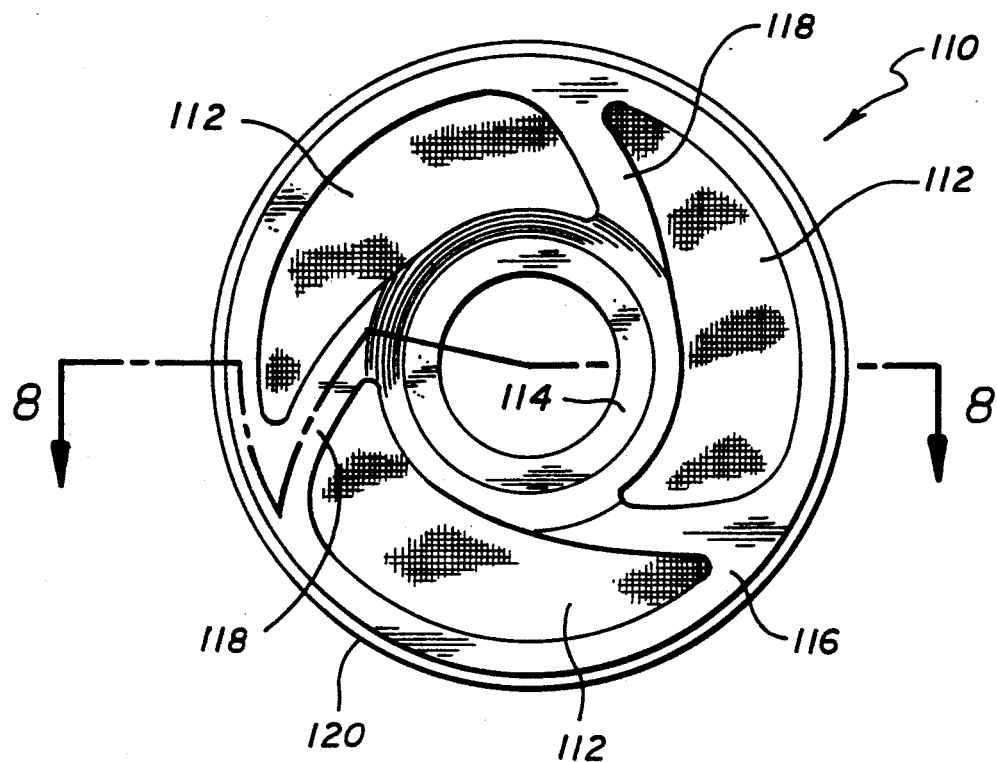
FIG. 7 is an enlarged top plan view illustrating a solenoid filter for use in the invention.
Figure 8:
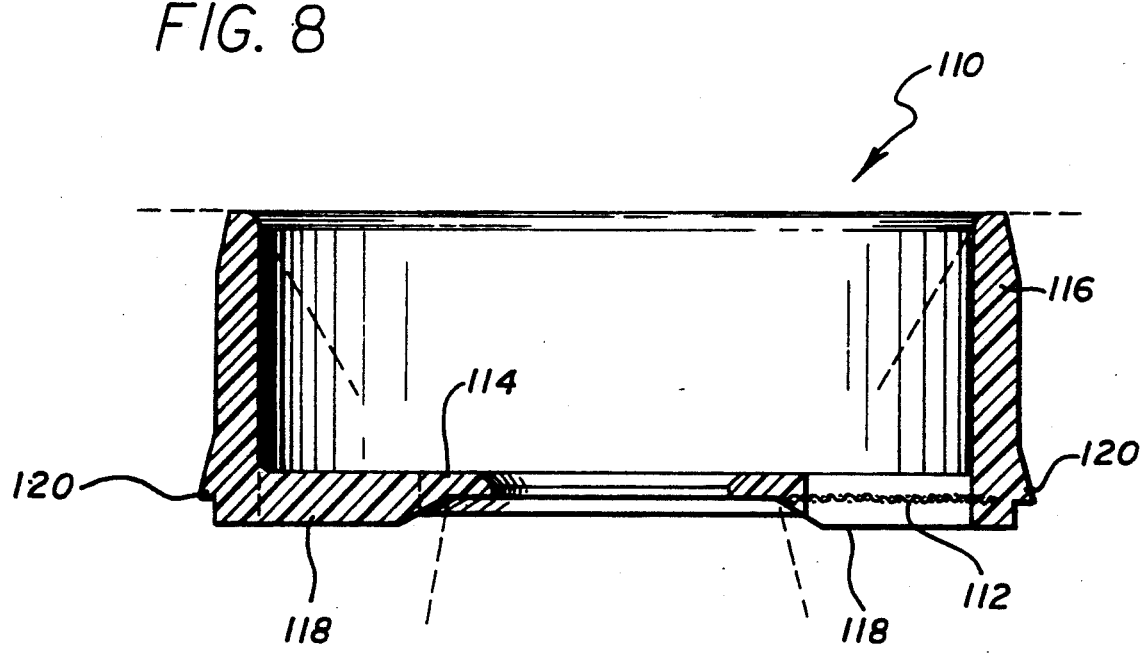
FIG. 8 is a transverse vertical sectional view taken generally on the line 8—8 of the FIG. 7.

FIGS. 7 and 8 show a solenoid filter 110 for use in preventing entry of water-borne debris into the solenoid unit 34, wherein such debris ingress could otherwise interfere with moving components of the solenoid unit. As shown, the solenoid filter 110 has a generally cup-shaped configuration adapted to fit over the ported retainer 72 at the nose end of the solenoid unit. A fine mesh screen element 112 of annular shape is mounted as by comolding to extend between a ring-shaped hub 114 and an outer cylindrical filter case 116. Spiraled webs 118 may extend radially outwardly from the hub 114 to assist in supporting and retaining the screen element 112. An external snap rib 120 on the outer case 116 is shaped for snap-fit reception with internal protrusions 122 (FIG. 2) at the nose end of the solenoid unit to seat the filter 110 over the retainer 72.

In use, the screen element 112 of the solenoid filter 110 defines a filtered annular flow path of admission of water passing from the control chamber 30 via the exit port 73 to the solenoid unit. The filter 110 blocks passage of grit and debris entrained within the water flow, against entry into contact with the plunger 60. Appropriate ports 124 (FIG. 2) in the retainer 72 permit water passage to a location above the retainer, whereat the position of the plunger tip 70 either prevents or permits water outflow through a central bleed port 126 is in flow communication with the bleed passage 36, with the filter hub 114 seated between the retainer 72 and a raised nipple 128 at the upper end of the bleed passage 36.

The improved solenoid actuator valve 10 of the present invention thus provides for diaphragm responsive operation of the valve head 14 for movement between open and closed positions. The annular flexible region of the diaphragm is subjected to relatively minimal and substantial zero pressure differentials in both of the open and closed positions, while the flow control piston 38 provides a convenient and easily adjusted means for selecting the specific fluid flow rate through the open valve. The flexible portion of the diaphragm is thus exposed to significant pressure differential only during short transition periods of movement between the closed and open positions.

A variety of further modifications and improvements to the present invention will be apparent to those skilled in the art. Accordingly, no limitation on the invention is intended by way of the foregoing description and accompanying drawings, except as set forth in the appended claims.

What is claimed is:

1. A solenoid actuated valve, comprising:
   a valve housing having a valve inlet and valve outlet;
   a valve member disposed generally between said valve inlet and outlet, and movable between open and closed positions for respectively permitting and preventing fluid flow from said valve inlet to said valve outlet;
   a control chamber adapted to receive pressurized fluid;
   a pressure-operated diaphragm coupled with said valve member and operable to move said valve member between said open and closed positions, said diaphragm having a flexible portion in fluid pressure communication on opposite sides thereof with said valve inlet and said control chamber;
   passageway means for admitting fluid from said valve inlet to said control chamber;
   a solenoid unit for controlling the pressure of fluid within said control chamber, said solenoid unit in one condition permitting the pressure within said control chamber to substantially equal the pressure at said valve inlet whereby the control chamber pressure acts on the diaphragm to hold said valve member in the closed position, and in another condition opening a bleed passage to relieve pressure within said control chamber sufficiently to permit pressure at the valve inlet to move said diaphragm to displace said valve member to the open positions; and
   flow control means within said control chamber for metering fluid flow from pressure communication with said diaphragm flexible portion within said control chamber to said bleed passage when said valve member is in the open position to maintain a substantially minimum pressure differential across said diaphragm flexible portion.

2. The solenoid actuated valve of claim 1 wherein said diaphragm flexible portion has a generally annular shape surrounding said valve member.

3. The solenoid actuated valve of claim 1 including means for adjustably positioning said flow control means within said control chamber to select the position of said valve member in said open position and thereby select the valve fluid flow rate when said valve member is in the open position.

4. The solenoid actuated valve of claim 1 further including spring means for biasing said valve member toward the closed position.

5. The solenoid actuated valve of claim 1 wherein said passageway means comprises a port formed in said diaphragm flexible portion, and further including a diaphragm filter for filtering fluid passing from said valve inlet and through said port to said control chamber.

6. The solenoid actuated valve of claim 5 wherein said diaphragm filter comprises a filter screen carried by a support cartridge and cooperating therewith to define a cavity for receiving fluid passing from said valve inlet through said screen, said cartridge having a barbed tubular tip for reception through said diaphragm for passage of the fluid from said cavity to said control chamber.

7. The solenoid actuated valve of claim 1 wherein said solenoid unit includes a movable plunger for respectively preventing and permitting fluid flow through a ported retainer disposed in-line with said bleed passage, and further including a solenoid filter for preventing entry of unfiltered fluid into contact with said plunger.

8. The solenoid actuated valve of claim 1 wherein said diaphragm has a disk shape with said valve member mounted centrally thereon and with said flexible portion having an annular shape surrounding said valve member, said flow control means comprising a generally cylindrical piston mounted within said control chamber and defining an annular leading edge presented toward said valve member, said valve member displacing toward said leading edge upon movement toward the open position and cooperating therewith in the open position to subdivide said control chamber into an outer annular zone in pressure communication with said diaphragm flexible portion and an inner zone in pressure communication with said valve member, said valve member cooperating with said leading edge to meter fluid flow from said outer zone to said inner zone.

9. The solenoid actuated valve of claim 8 further including manual handle means accessibly mounted at the exterior of said valve housing for displacing said flow control piston toward and away from said valve member.

10. In a solenoid actuated valve of the type including a valve inlet and a valve outlet, a diaphragm operated by fluid pressure for opening and closing a valve member disposed between the valve inlet and outlet, a control chamber for receiving control fluid from the valve inlet, said diaphragm having a flexible portion in fluid communication at opposite sides thereof with said valve inlet and said control chamber, and a solenoid unit for controlling the fluid pressure in the control chamber so that in one condition the fluid pressure in the control chamber acts on the diaphragm to maintain the valve member in a closed position, and in another condition relieves the fluid pressure in the control chamber so that the fluid pressure at the valve inlet moves the diaphragm and the valve member to an open position, the improvement comprising:

flow control means within said control chamber for metering fluid flow from said control chamber when said valve member is in the open position to maintain a substantially minimum pressure differential across the flexible portion of the diaphragm.

11. The improvement of claim 10 including means for adjustably positioning said flow control means within said control chamber to select the position of said valve member in said open position and thereby select the valve fluid flow rate when said valve member is in the open position.

12. The improvement of claim 10 further including a filter cartridge mounted on said diaphragm flexible portion for admitting filtered water from said valve inlet through a diaphragm port to said control chamber.

13. A solenoid valve assembly comprising:
a valve housing having a valve inlet, a valve outlet, and a valve seat disposed therebetween;
a valve member movable between open and closed positions with respect to said valve seat for respectively permitting and preventing fluid flow from said valve inlet to said valve outlet;
a control chamber within said housing and adapted to receive pressurized fluid;
a pressure-operated diaphragm coupled with said valve member and operable to move said valve member between said open and closed positions, said diaphragm having a generally annular flexible portion surrounding said valve member and disposed on opposite sides thereof in pressure communication with said valve inlet and said control chamber when said valve member is in the closed position, said valve member being disposed on opposite sides thereof in pressure communication with said valve outlet and said control chamber when said valve member is in the closed position;
passageway means formed in said diaphragm flexible portion for admitting fluid from said valve inlet to said control chamber;
a solenoid unit for controlling the pressure of fluid within said control chamber, said solenoid unit in one condition permitting the pressure within said control chamber to substantially equal the pressure at said valve inlet whereby the control chamber pressure acts on the diaphragm to hold said valve member in the closed position, and in another condition opening a bleed passage to relieve pressure within said control chamber sufficiently to permit pressure at the valve inlet to move said diaphragm to displace said valve member to the open position; and a flow control piston within said control chamber, said flow control piston having a generally cylindrical shape to define an annular leading edge presented toward said valve member, said valve member displacing toward said leading edge upon movement toward the open position and cooperating therewith in the open position to subdivide said control chamber into an outer annular zone in pressure communication with said diaphragm flexible portion and an inner zone in pressure communication with said valve member, said valve member cooperating with said leading edge to meter fluid flow from said outer zone to said inner zone, so that a substantially minimum pressure differential is maintained across said diaphragm flexible portion when said valve member is in the open position, said inner zone being in flow communication with the bleed passage when said solenoid unit is in said another condition opening the bleed passage.

14. The solenoid actuated valve of claim 13 wherein said passageway means comprises a port formed in said diaphragm flexible portion, and further including a diaphragm filter for filtering fluid passing from said valve inlet and through said port to said control chamber.

15. The solenoid actuated valve of claim 14 wherein said diaphragm filter comprises a filter screen carried by a support cartridge and cooperating therewith to define a cavity for receiving fluid passing from said valve inlet through said screen, said cartridge having a barbed tubular tip for reception through said diaphragm for passage of the fluid from said cavity to said control chamber.

16. The solenoid actuated valve of claim 13 wherein said solenoid unit includes a movable plunger for respectively preventing and permitting fluid flow through a ported retainer disposed in-line with said bleed passage, and further including a solenoid filter for preventing entry of unfiltered fluid into contact with said plunger.

17. The solenoid actuated valve of claim 13 further including manual handle means accessibly mounted at the exterior of said valve housing for displacing said flow control piston toward and away from said valve member.

18. In a solenoid actuated valve of the type including a pressure-operated diaphragm for opening and closing a valve member, a control chamber for receiving fluid under pressure to operate the diaphragm, and a solenoid unit having a ported retainer with a bleed port formed therein and mounted with said bleed port disposed in-line with a bleed passage leading from the control chamber, and further including a plunger movable between a first position closing the bleed port to maintain fluid pressure within the control chamber and a second position opening the bleed port to relieve pressure within the control chamber, the improvement comprising:

a solenoid filter removably snap-fit mounted over said ported retainer along the bleed passage at a position upstream from said solenoid plunger to filter fluid relieved through said bleed passage prior to communication of the relieved fluid with said bleed port.

19. A solenoid unit for use in a solenoid actuated valve, said solenoid unit comprising:

a solenoid housing having a solenoid winding and a movable solenoid plunger mounted therein, said solenoid housing including an open nose end;

a ported retainer mounted within said nose end and defining at least one fluid inflow port and a fluid outflow port separated by a valve seat, said solenoid plunger being movable between first and second positions for opening and closing said valve seat to respectively permit and prevent fluid flow from said inflow port to said outflow port; and a solenoid filter mounted at said nose end in a position over said inflow port to filter fluid entering said inflow port, said nose end of said solenoid housing and said solenoid filter including snap-fit means for removably retaining said filter over said at least on inflow port.

* * * * *